Jan. 2, 1923.

R. McCLENATHEN ET AL.
TIRE TRIMMER.
FILED SEPT 8, 1921.

INVENTORS
HARRY G. ARTHUR
-AND-
ROBERT McCLENATHEN
BY
RHWaters
ATTORNEY.

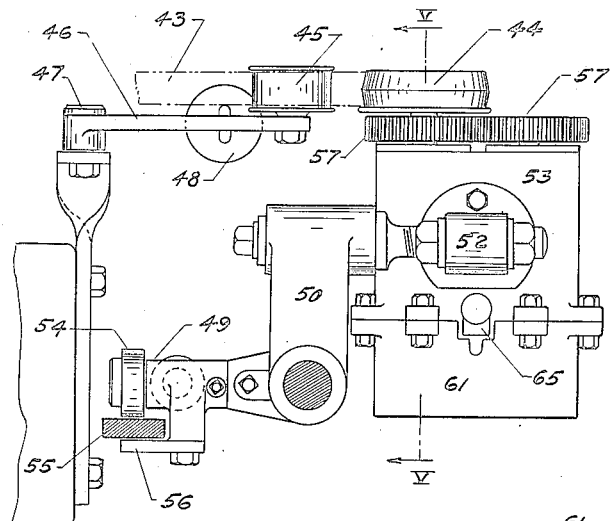
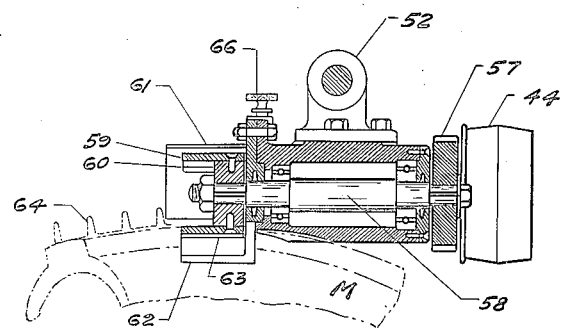
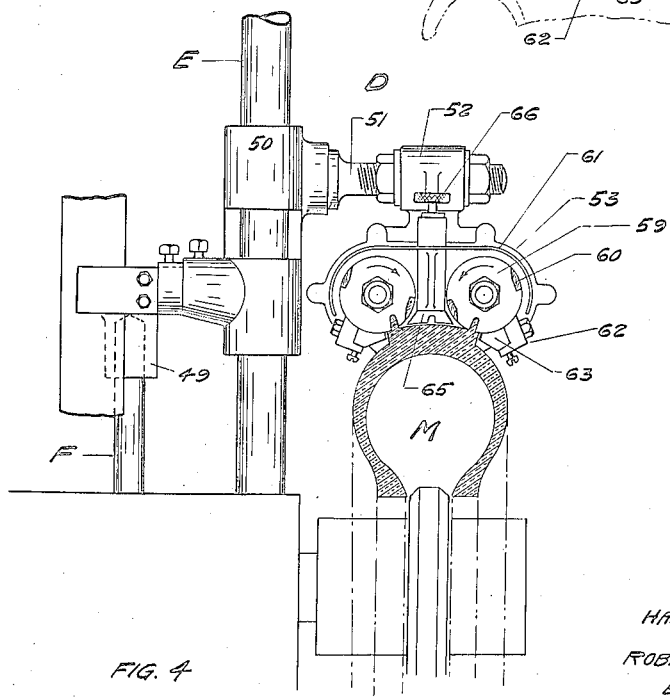

Patented Jan. 2, 1923.

1,440,397

UNITED STATES PATENT OFFICE.

ROBERT McCLENATHEN AND HARRY G. ARTHUR, OF AKRON, OHIO, ASSIGNORS TO KELLY-SPRINGFIELD TIRE COMPANY, OF AKRON, OHIO, A CORPORATION OF NEW JERSEY.

TIRE TRIMMER.

Application filed September 3, 1921. Serial No. 499,180.

*To all whom it may concern:*

Be it known that we, ROBERT McCLENA-THEN and HARRY G. ARTHUR, citizens of the United States, residing at Akron, in the county of Summit and State of Ohio, have invented certain new and useful Improvements in a Tire Trimmer, of which the following is a specification.

This invention relates to a machine for trimming the excess from articles of manufacture in order that their appearance and utility may be enhanced, and more especially to the trimming of mold overflow incidental to the production of rubber tires;
for instance, such as are produced by the molding process disclosed in United States Letters Patent No. 1380085 of May 31st, 1921, to Charles L. Walton.

The particular object of the invention is to provide a device for efficiently and expeditiously trimming the tires in a more economical manner than heretofore accomplished manually. A further object is to attain substantially an automatic device requiring only that an operator feed the untrimmed tire into position and remove it upon the completion of the trimming. As a still further object the mechanism is designed to automatically adapt itself to the handling of tires of varying diameters without necessitating adjustments.

To the attainment of these and other useful objects, this invention consists in the construction and novel combination of parts hereinafter fully described, illustrated in the drawings and specifically claimed.

An embodiment of the invention is disclosed, by way of illustration, in the accompanying drawings, in which:—

Figure 1 is a side elevation of the assembled machine.

Figure 3 is an enlarged top view of the floating cutter head assembly.

Figure 4 is an enlarged elevation of the floating cutter head taken at the position approximately indicated at IV—IV in Fig. 2.

Figure 5 is a longitudinal section through the cutter head at approximately the plane indicated at V—V in Fig 3.

Figure 1:
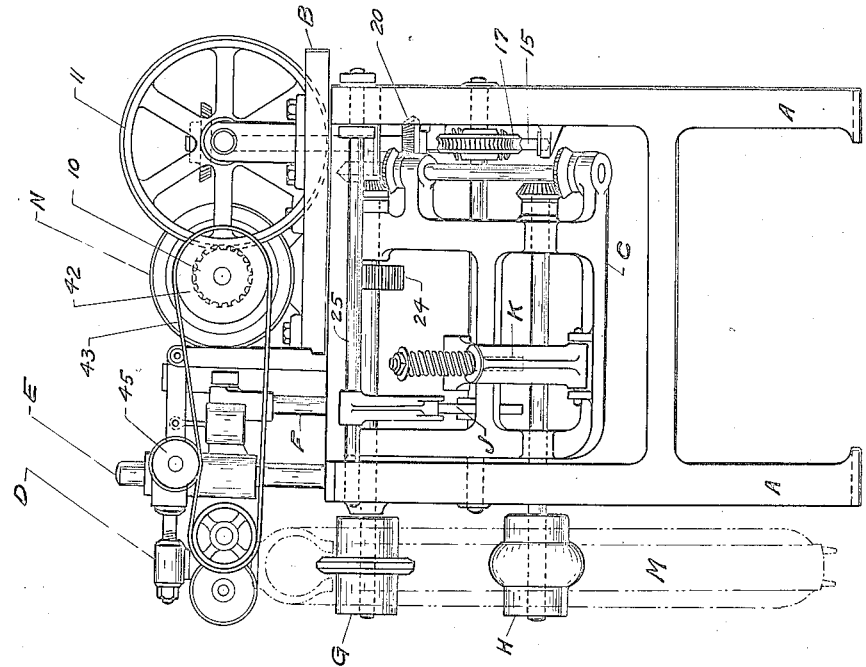

Referring particularly to the drawings, the general description will be given by reference numerals common to like parts throughout, it being noted that where the mechanical expedients adopted are obvious to those well-skilled in the art only general reference thereto will be made:—

Figure 2:
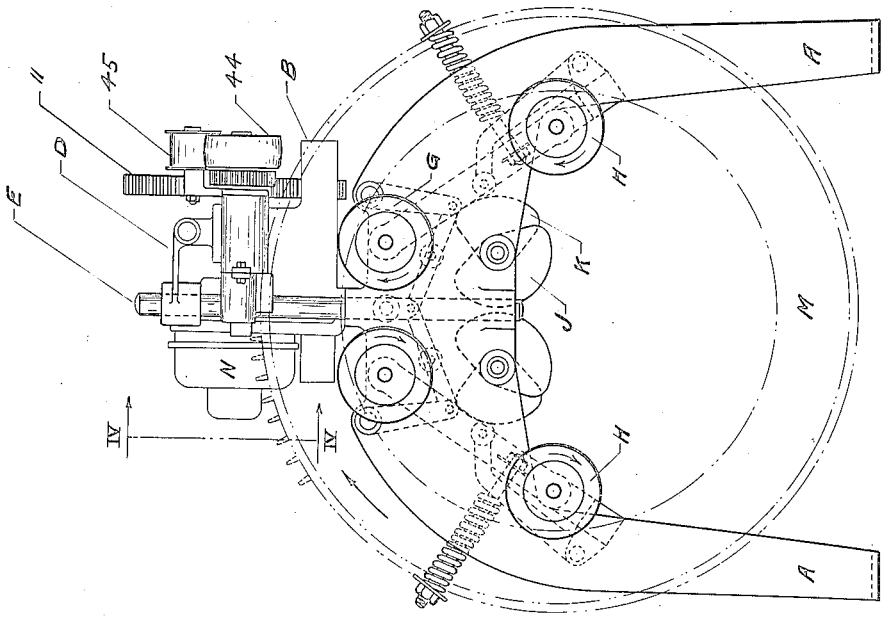
Figure 2 is an end view, showing the front or operating end.

Referring especially to Figs. 1 and 2, the fundamental principle will be briefly disclosed in order that the detail description of the operating gear may be readily comprehended. Mounted on the frame "A" is a rigid bed plate "B", upon which the driving motor "N" and other associated gearing is located. By suitable transmission the upper tire rotating rollers "G," on their fixed centers, and the lower rollers "H", on their swinging centers, are caused to turn in the same direction at the same speed for the purpose of revolving a tire "M" into the rotary cutters within the floating head "D". In order that the tire may be placed upon the rollers the lower set "H" is designed to alternately swing outwardly to frictionally enter the gaping bead void when the oscillating frame "C" is actuated by its cam "K" and to relax inwardly a sufficient degree to permit of the tire being rested on the rolls "G" and passed over the outside of rolls "H" whereby an outward swing of the latter will clamp and rotate the tire. In order that the floating head "D" with its rotary cutter knives may be manipulated to alternately operate upon the tire and lift clear for the period necessary to remove one upon which the trimming has been done and replace an untrimmed tire, the entire head mechanism has been designed to reciprocate vertically on the guide rod "E" under the control of the lift rod "F" which is actuated by the cam "J" suitably mounted on the same cam shaft with cam "K" and so timed in relation therewith that the head "D" rises from the tire while the rolls "H" are relaxing and drops into operating contact with the tire when the rolls "H" have again been forced outwardly in frictional engagement with an untrimmed tire.

It will be understood that the machine is of the continuously running, semi-automatic type; the only operation required of the attendant, who, of course, is unskilled labor, is that of putting a tire on and taking it off at the proper time, the time for his effort being indicated automatically by the periodic lifting of the head "D".

Figure 6:
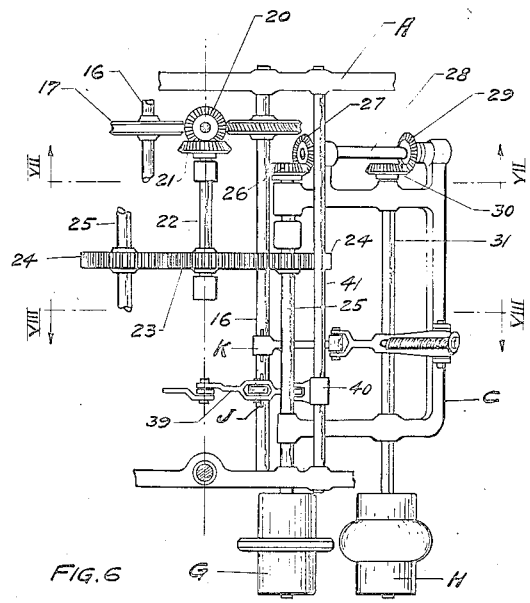
Figure 6 is a diagrammatic plan view of the gearing below the level of the bed plate.
Figure 7:
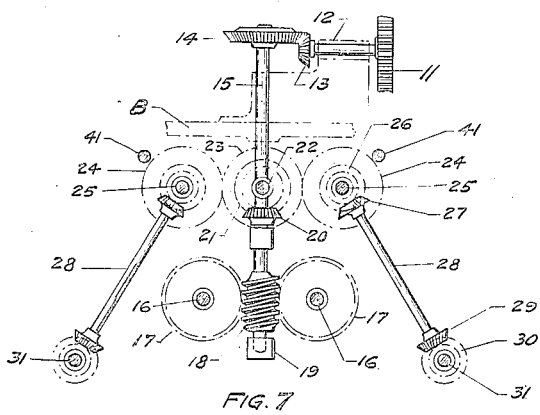
Figure 7 is a diagrammatic elevation at approximately the plane VII—VII of Fig. 55 6, looking to the rear.

*Tire revolving gear and cams.*—A spur gear 10 on the motor shaft drives the main spur gear 11 which has a horizontal shaft 12 terminating in a bevel gear 13 meshing with a similar type gear 14. (See Figs. 1, 2, and 7.) Vertical shaft 15 is keyed to the gear 14 and transmits the primary power to the associated gearing below the bed plate in two separate transmissions. First the cam shafts 16 are actuated through their attached worm wheels 17 in engagement with the worm 18 on shaft 15 which is suitably journaled in a foot bearing 19. The second transmission system drives the tire rotating rollers "G" and "H", as follows:—Intermediate the length of shaft 15 (see Figs. 6, 7, and 8) is a bevel gear 20 meshing with a similar member 21 keyed on counter shaft 22 which terminates in a spur gear 23 meshing with similar gears 24 on shaft 25 which drives the upper rollers "G". Rotation of lower rollers "H" is effected through miter gear 26 on shaft 25 meshing with a similar gear 27 on the short swinging transmission shaft 28 which terminates in a second gear 29 mounted just above the lower end of 28 in its journal on oscillating frame "C". Miter gear 30 on one end of lower roller shaft 31 is in mesh with 29.

It is here noted that shaft 31 is journaled in the lower portion of oscillating frame "C" and with the roller "H" is free to swing under the impulse and control of the cam "K"; the frame "C" being freely suspended from the shaft 25.

In (Figs. 2 and 8) the control of the swing of lower roller "H" by cam "K" on shaft 16 is shown, wherein it is noted that the cam contacts, in the positive position, with a roller 32 in the bifurcated end of tension arm 33 fulcrumed at 34 to the end of frame "C". The roller 32 is yieldingly kept in contact with the cam "K" for a portion of its cycle by tension spring 35 surrounding bolt 36 and reacting against the head of same and the outer face of 33, the bolt being retained within a lug 37 on the arm "C". It is thus apparent that the function of the tension device is to afford resiliency of contact between roller "H" and the inside of the tire "M" whereby it is obvious that tires of varying internal diameter may be mounted upon the roller heads without change; this being an additional advantage aside from the superior efficiency of rotating clutch between roller and tire residing in the resilient pressure exerted at all times during the trimming cycle. (See Fig. 2.)

Figure 8:
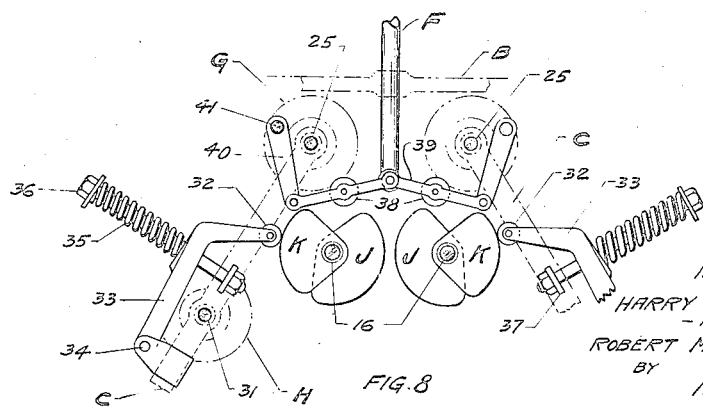
Figure 8 is a diagrammatic elevation at approximately the plane VIII—VIII of Fig. 6, looking to the front.

By reference to Figs. 2 and 8 it is noted that the cam "K" is in engagement with the mechanism resulting in spreading the rolls "H" into yielding clutch with the tire during the trimming cycle and that cam "J" which controls the reciprocation of the floating cutter head "D" is in the "off" position, whereby the cutter is permitted to contact by gravity with the work. The lifting of the cutter head "D" out of contact with the tire is accomplished when the cycle brings cams "J" into contact with the rollers 38 suitably journaled intermediate the links 39, one end of each being pinned to the lower end of lift rod "F"; the opposite ends being pinned to the free ends of swinging arms 40 which are journaled on the horizontal tie rods 41 uniting the opposed elements of frame "A". It is thus evident that the simultaneous contact of the cams "J" with the rollers 38 will, through their associated linkage, cause the head "D" to rise and fall at regular intervals in timed relation with the oscillation of the frame "C" with its associated mechanism.

*Cutter head mechanism.*—By particular reference to Figs. 1, 3, 4 and 5 the rotary cutter drive contained within the floating head "D" will be understood. On the extreme end of the motor shaft a pulley 42 is keyed, over which a belt 43 is run, the opposite end driving a pulley 44 attached to one of the spindles of one of the rotary cutters. A belt tightener is located on the belt length, comprising an idler 45 on the end of an arm 46 which is suitably fulcrumed at 47 on a brace extending from the bed plate "B". Depending from the arm 46 is a suitable weight 48 which exerts a uniform tension on the belt in compensation for the rise and fall of the entire head "D".

The top of the lift rod "F" terminates in a bracket 49 suitably attached to a casting 50 slidably mounted on the guide rod "E"; a stud 51 horizontally projects within a bearing 52 on the casing 53 whereby the entire knife element may be angularly adjusted about its horizontal center at will. In order that the torque set up by contact of the rotating tire with the cutters, tending to twist the head about its vertical journal post "E" shall be countered, a roller 54 is provided on the rear end of bracket 49 and contacting with a vertical flat bar stop 55 suitably attached to the bed "B", also a guide lug 56 is provided on an extension of 49 to travel along the side of the stop 55 opposite the roller 54.

Rotation of the cutter elements in opposite direction is effected by intermeshing spur gears 57, one of which is locked to the pulley 44. Within the casing 53 are a pair of knife spindles 58 keyed at one end to the gears 57 and at their extremities to rotating knife heads 59 to which spirally directed knives 60 are suitably attached, the whole being encased by a guard 61. Fixed near the bottom of each rotating head 59 is a fixed blade holder 62 suitably attached to a non-rotating portion of the casing 53 and supporting a fixed blade 63 which is adjustable by suitable set screws to slide along the sides of the raised tread portion of the tire to act as a guide, and also constituting one blade of a shear of which the rotating blades 60 are the other and between which the projections 64 on the tire are made to pass and be sheared therebetween.

The depth of the cut made by the knives 60 is regulated by a runner 65 (see Fig. 4) which contacts with the flat central portion of the tire tread, between the projections to be trimmed, and slides thereon, whereby the tendency of the head "D" to press too deeply into the tire structure is arrested and controlled. The runner is suitably housed within vertical guides in the fixed casing 53 and is vertically adjustable by means of a set screw 66.

As the knives 60 rotate at a high speed only two are shown on each carrier, but it is apparent that any type of rotary knife blade and any number thereof may be provided to accomplish the purpose; also that any type of fixed shear blade may be resorted to.

In the illustrative embodiment of this invention duplex cutters revolving in opposite directions and operating to trim off the peculiar overflow tips characteristic of the particular tire shown in Letters Patent 1380085 have been shown. It is apparent that this disclosure is not limited to the exact mechanism shown, nor to the particular operation chosen as an illustration of its utility. As regards the mechanism of the rotary cutter, that element might be of the single head type utilized to trim off a single line of excess, either in the form of the tips 64 indicated, or constituting the central overflow fin, or the like. As regards the excess requiring removal, that may take any conventional form common to the molding art; the minor changes in the mechanism required to more effectively meet various conditions falling within the scope of the invention and being embraced within the range of the appended claims.

Having thus described our invention what we claim and desire to protect by Letters Patent is:

1. A machine of the character described, comprising a trimming element; means for holding and rotating an article having peripheral excesses requiring removal, said holding and rotating means being automatically controlled whereby the article is intermittently fed to the trimmer and removed therefrom at the completion of the operation; and means for intermittently applying and removing the trimmer automatically in timed relation with the intermittent feed and release of the holding and rotating means.

2. A machine of the character described, comprising a rotary trimming element having means for automatically applying and removing said element intermittently to and from the work; means for positioning and rotating the work with respect to the trimmer, said means having automatic control whereby the work is intermittently grasped and released in timed relation with the operation of the trimmer mechanism.

3. A machine of the character described, comprising a trimming element having means for automatically applying and removing said element intermittently to and from the work; means for positioning and rotating the work with respect to the trimmer, said means comprising a plurality of rotating elements, some of which yieldingly grasp the annular work whereby operative contact may be had with annular articles of varying diameters without adjusting the grasping means.

4. A machine of the character described, comprising a power-driven rotary trimmer having means for automatically applying and removing said element to and from the periphery of an annular article having an excess thereon to be removed; power-driven rotary means for positioning and resiliently grasping and rotating the work with respect to the trimmer, said grasping means being automatically controlled to remain in contact with the work during the trimming operation and to release same at the completion; and means in timed relation with the grasping means for automatically relating the contact of the trimmer with the work to the operative period of said grasping means.

5. A machine of the character described, comprising a duplex trimming element consisting of rotary power-driven blades adapted to remove the peripheral excess from an annular article of manufacture; means for positioning and rotating said article whereby the excess is removed by the trimmer; and means for automatically applying and removing the trimmer with respect to the work intermittently in timed relation with other means for automatically and intermittently grasping and releasing the work.

6. In a tire trimming machine, a duplex head comprising power-driven knives in opposed sets and rotated in opposite direction; an adjustable stationary blade on each opposed element adapted to serve as a shear element for the rotating blades and to laterally guide a work article rotatably passed within the cutting zone of the knives; adjustable guide means adapted to gage the depth of the knife cut whereby the quantity of excess to be removed from the article is determined.

7. In a tire trimming machine, the combination with means for automatically positioning and rotating a tire having a peripheral excess to be removed, said means comprising a pair of rollers adapted to intermittently grasp and release the tire in timed relation with the operating period of the trimmer, and other rollers having fixed centers and adapted to rotate and position the work with respect to the trimmer, of a rotary trimmer comprising knives and fixed shear blades, said trimmer having means for automatically and intermittently applying the blades to the rotating work in timed relation with the operating period of the grasping and releasing roller means.

8. A semi-automatic tire trimming machine adapted to remove the peripheral excess from a molded tire, comprising rotary trimming means and work positioning and rotating means, said trimming and work manipulating means being correlated by power drive means adapted to intermittently operate the trimming means on the work in related time to the operative cycle of the work positioning and rotating means.

9. A semi-automatic trimming machine adapted to remove the peripheral excess from an annular ring-like article of manufacture, comprising rotary trimmers and work-manipulating means adapted to intermittently expose the work to the influence of the trimmers, and correlated driving means for the trimmers and work-manipulating means, said correlated driving means being adapted to effect relative movement of the trimmers and the work-manipulating means whereby a trimming operation is effected throughout at least a full rotation of the ring-like article by its manipulating means.

10. A semi-automatic trimming machine adapted to remove the peripheral excess from an annular ring-like article of manufacture, comprising, in combination, means for resiliently grasping and rotating the article, trimming means adapted to operate upon the periphery of the article during its period of rotation, and means for automatically moving the trimming means toward and away from the periphery of the rotating article in timed relation with its period of rotation.

11. A device of the character described, comprising in combination, means for resiliently grasping and rotating an annular ring-like article in automatically controlled cycles, a trimming device comprising rotary cutting blades, a guide to regulate the depth of entry of said blades into the article to be trimmed, and cooperating means for rotating the ring-like article and the trimming means whereby the trimming device is alternately applied to and removed from operative contact with the article, periodically.

In testimony whereof we affix our signatures.

ROBERT McCLENATHEN.
HARRY G. ARTHUR.